United States Patent [19]
Sprecher

[11] 3,858,826
[45] Jan. 7, 1975

[54] VEHICLE OCCUPANT RESTRAINT BELT RETRACTOR

[75] Inventor: Raymond G. Sprecher, Detroit, Mich.

[73] Assignee: General Motors Corporation, Detroit, Mich.

[22] Filed: Aug. 23, 1973

[21] Appl. No.: 390,782

[52] U.S. Cl............................. 242/107.7, 242/107.4
[51] Int. Cl....................... A62b 35/02, B65h 75/48
[58] Field of Search......... 242/107.7, 107.6, 107.12, 242/107.15, 107 R, 107.2, 99, 107 SB, 107.4; 74/576, 577 S, 577 SF; 160/299, 300, 301, 302; 280/150 SB; 297/388; 188/82.7, 82.4

[56] References Cited
UNITED STATES PATENTS

| | | | |
|---|---|---|---|
| 777,140 | 12/1904 | Redheffer | 242/107 R |
| 1,027,663 | 5/1912 | Miller | 242/107.7 |
| 1,524,172 | 1/1925 | Dewey | 242/107.7 |
| 1,737,323 | 11/1929 | Mursu | 242/107.7 |
| 2,990,132 | 6/1961 | Mills | 242/107.7 |
| 3,206,137 | 9/1965 | Snyderman | 242/107.7 |
| 3,211,496 | 10/1965 | Zaydel | 242/107.12 |
| 3,343,764 | 9/1967 | Webb | 242/107.4 |
| 3,635,420 | 1/1972 | Romanzi | 242/107.4 |
| 3,741,496 | 6/1973 | Beller | 242/107.4 |

*Primary Examiner*—Billy S. Taylor
*Attorney, Agent, or Firm*—J. A. Kushman

[57] ABSTRACT

A vehicle occupant restraint belt retractor in which a winding prevention mechanism responsive to belt reel rotation prevents belt winding reel rotation under the spring bias of the reel when the belt is being buckled in use position after unwinding from its fully stored condition on the reel. The mechanism includes a pawl for engaging the reel to prevent the belt winding movement thereof and a sensing member that moves under a leaf spring bias in response to the diameter of stored belt on the reel so as to control the pawl movement as a function of the length of unwound belt. The pawl is mounted on a shaft of the retractor housing in a pin and slot fashion for pivotal and limited bodily shifting movement with respect thereto and the sensing member is pivotally mounted on the same shaft. A pin and leaf spring on the sensing member are engageable with and control the pawl movement in a manner that allows belt winding reel rotation after the buckled belt is pulled from the retractor a slight amount. Secondary locking surfaces on one of the end plates of the retractor belt reel are arranged in opposed relationship to the primary locking surfaces that are selectively engaged by the retractor locking member to prevent belt unwinding reel rotation, and these secondary surfaces are where the pawl engages the reel to prevent the belt winding reel rotation.

2 Claims, 6 Drawing Figures

VEHICLE OCCUPANT RESTRAINT BELT RETRACTOR

BACKGROUND OF THE INVENTION

This invention relates generally to vehicle occupant restraint belt retractors, and more particularly to such retractors in which the normal winding bias of the retractor belt reel is selectively prevented to hold the belt unwound for use.

Vehicle occupant restraint belts for belting a vehicle occupant in seated position have been used on production vehicles for many years. The belts may be lap belts that extend across the seat over the occupant's lap or may be shoulder belts which extend diagonally across the occupant's chest. Generally, in order to provide an aesthetically appealing appearance, the fixed end of the belt is received by the reel of a belt retractor that has a spring bias normally winding the belt on the reel so that the belt is hidden from sight within the retractor. Each of the ends of the reel customarily include end plates which define circumferentially spaced locking surfaces that face in the belt unwinding direction of reel rotation and are selectively engaged by a locking member of the retractor so as to prevent belt unwinding movement and thereby restrain the belted occupant.

It is also known to provide various mechanisms which engage the reel to prevent the belt winding reel bias from winding the belt in from its use position. For the most part, these mechanisms are deactuated to allow this belt winding by way of a manual release which requires an occupant effort independent of the manual effort expended in moving the belt. One such known mechanism also provides locking retraction in response to the rate of reel rotation. This mechanism includes a planetary gearing arrangement whose ring gear is carried by the retractor belt reel and whose sun gear pivotally carries one or more pawls. The pawl pivots under the bias of gravity into engagement with a fixed notch on the retractor housing when an occupant holds the unwound belt and allows slow winding thereof so that this engagement prevents the normal winding bias of the reel from pulling the belt inwardly. Manual release of the unwound belt allows a more sudden belt winding reel rotation which causes the sun gear to move much more rapidly and the pawl is then held out of engagement with the notch by centrifugal force so as to allow the normal winding rotation of the belt reel.

Customarily, the free end of the restraint belt carries an attachment portion such as a buckle or a D-ring that is selective attachable to a buckle, and the attachment portion is cooperable with a complementary attachment portion on another belt portion so as to secure the belt in its unwound or use position. An occupant must necessarily hold the belt outward against the winding bias of the associated retractor belt reel as these attachment portions are buckled unless a mechanism is provided for preventing the winding of the belt. If the winding prevention mechanism is of the manually unactuated type, an additional occupant effort independent of the effort expended in moving the belt is thus necessary to allow reel rotation that winds the belt. The above-discussed winding preventing mechanism which uses the planetary gearing arrangement likewise requires that an occupant do more than pull the belt to its unwound use position since the occupant with this type of mechanism must also hold the belt and allow a slow winding movement in order to provide the winding prevention.

SUMMARY OF THE INVENTION

This invention provides a vehicle occupant restraint belt retractor with a belt reel winding prevention mechanism responsive to unwinding of the belt from its fully stored condition so as to prevent belt winding reel rotation and responsive to a slight subsequent belt reel unwinding movement to release the reel for belt winding movement.

One of the features of the invention is that the winding prevention mechanism includes a pawl that is moved into a locked position in response to rotation of the retractor belt reel as the belt unwinds from its fully stored condition so that the pawl engages the reel to prevent winding of the belt as the belt is being attached or buckled in use position, and the pawl is moved to an unlocked position out of engagement with the reel in response to a slight belt unwinding rotation of the reel so that the belt thereafter is wound on the reel by the normal winding bias thereof in a manner that snugly belts a vehicle occupant. Another feature of the invention is that the winding prevention mechanism measures the diameter of the stored belt on the reel so as to sense the unwinding movement of the belt from its fully stored condition. Another feature of the invention is that the engagement between the pawl and the reel is at circumferentially spaced secondary locking surfaces on one of the end plates of the reel and these secondary locking surfaces face in the direction of belt winding movement in generally opposed relationship to primary locking surfaces on this end plate which are engaged by the locking member of the retractor to selectively prevent belt unwinding. Another feature of the invention is that the pawl is mounted on the housing in a pin and slot fashion and a sensing member that measures the diameter of stored belt on the reel has a first surface which engages a cooperable first surface on the pawl to move the pawl to the locked position as the belt is unwound from its fully stored position, and a subsequent slight belt unwinding reel movement causes the pawl to slide at its support and bodily shift as well as pivot to an unlocked position where the sensing member and pawl are engaged at a second pair of surfaces to maintain their first pair of surfaces out of engagement until the belt is returned to a fully wound condition on the reel whereupon the pawl is moved to engage the first surface thereof with the first surface of the sensing member. Another feature of the invention is that a leaf spring carried by the sensing member moves the pawl toward a position where the second surfaces on the pawl and sensing member are in engagement with each other, and as the belt moves to a fully wound condition, the pawl moves under the bias of gravity and engages the first pair of surfaces on the pawl and sensing member to thereby ready the pawl for another movement into engagement with the reel upon subsequent unwinding of the belt.

BRIEF DESCRIPTION OF THE DRAWINGS

The objects, features and advantages of the present invention are readily apparent from the following detailed description of the preferred embodiment and the drawings in which.

DETAILED DESCRIPTION OF THE PREFERRED EMBODIMENT

Figure 1:
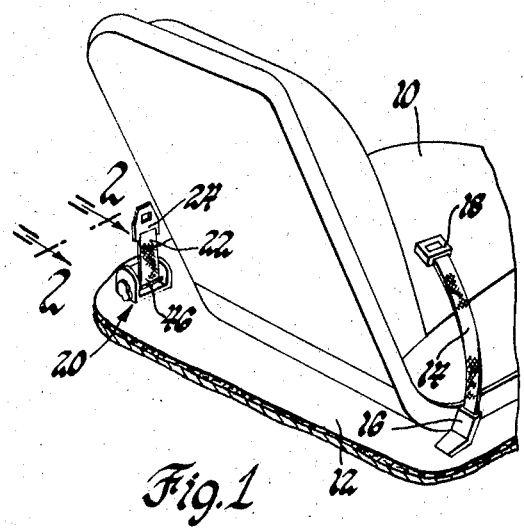
FIG. 1 is a perspective view of a vehicle body seat supported on a floor that also carries a restraint belt retractor whose cover is removed and which includes a winding prevention mechanism according to this invention.

Referring to FIG. 1 of the drawings, a vehicle body bucket-type seat 10 is supported on a vehicle body floor 12 in a conventional manner and has a short length of belt 14 located adjacent its right-hand side. The lower end of belt 14 is secured to the floor and covered by a plastic trim boot 16, while the upper end of this belt attaches a buckle indicated by 18. On the left-hand side of seat 10, a restraint belt retractor generally indicated by 20 is mounted on floor 12. This retractor winds and unwinds a length of belt 22 whose free end carries a D-ring 24. As the belt 22 is pulled out of retractor 20, the D-ring 24 is moved toward and into an interlocked relationship with buckle 18 so that a seated occupant is encircled by this belt arrangement.

Figure 2:
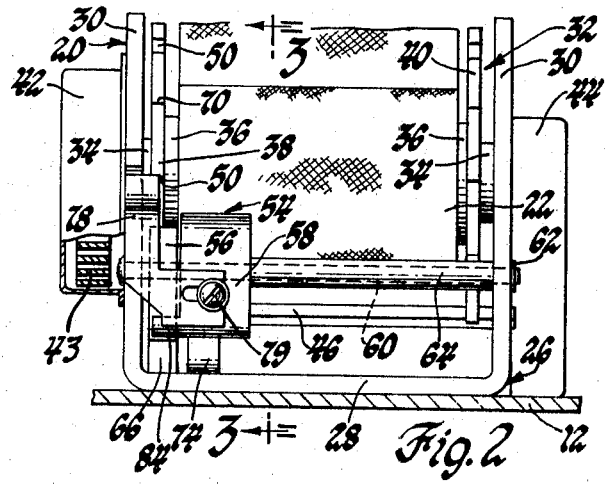
FIG. 2 is an enlarged side view of the retractor and its winding prevention mechanism taken generally along line 2—2 of FIG. 1.
Figure 3:
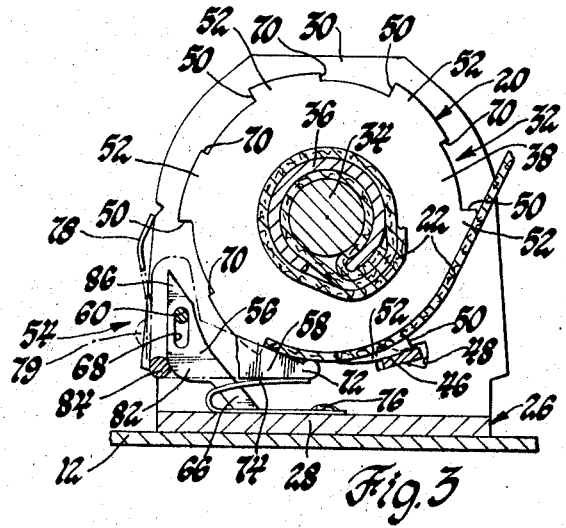
FIG. 3 is a sectional end view of the retractor taken along line 3—3 of FIG. 2 and shows the winding prevention mechanism with the belt of the retractor in its fully stored condition.

Referring additionally now to FIG. 2 of the drawings, the retractor 20 includes a housing indicated generally by 26 and including a lower base wall 28 and vertical side walls 30 located in spaced parallel relationship with respect to each other. The belt 22 is received by a reel 32 located between these side walls 30 of the retractor housing. Reel 32 includes a central elongated shaft 34, see FIG. 3 also, that extends between these side walls 30 and is rotatably supported thereby so as to support the reel 32 on the retractor. The inner end of belt 22 is looped around shaft 34, as seen in FIG. 3, and is wound about a somewhat rounded horseshoe-shaped drum 36 that encircles the shaft. The ends of drum 36 are respectively fixed to end plates 38 and 40 of the reel which are respectively seen in left-hand and right-hand positions in FIG. 2. These end plates are suitably fixed to shaft 34, such as by splines, so as to rotate with the reel as the belt 22 winds and unwinds.

The left-hand end of shaft 34 as viewed in FIG. 2 extends through the adjacent housing side wall 30 and to within a plastic cover 42 suitably mounted on this side wall. A spiralling spring 43, has its inner end fixed to shaft 34 and its outer end fixed to the sidewall within this cover so as to provide a spring bias which normally winds belt 22 on reel 32, this bias being in a clockwise direction when viewed as in FIGS. 3–6. As belt 22 is pulled out of the retractor so as to rotate the reel 32 in a counterclockwise direction, as viewed in these figures, the manual belt pull must act against this spring bias to unwind the belt. The FIG. 2 right-hand end of shaft 34 extends through the adjacent side wall 30 of the retractor housing and is received within a plastic cover 44. Cover 44 encloses an automatic locking type mechanism which is similar to the locking mechanisms used on current production vehicle retractors and, as such, is not shown in detail.

Referring particularly to FIGS. 1 and 3, a locking member 46 extends between the side walls 30 of the retractor housing and has its ends received by bow-tie-shaped apertures 48 in these walls. The locking member extends to within the cover 44 at its FIG. 2 right-hand end so as to be operated on by the automatic locking mechanism within this cover. This locking member is cooperable with circumferentially spaced primary locking surfaces 50 defined on the belt reel end plate 38 by radial projections 52 so as to selectively prevent unwinding of belt 22 from the reel. When the belt 12 is pulled from its fully wound condition on the belt reel and then allowed to be wound back on the reel to a slight degree under the bias of the spring 43 within cover 42, the locking mechanism within cover 44 moves the locking member 46 clockwise under a spring bias so that this locking member will engage the next locking surface 50 that moves toward the locking member and thus prevent subsequent belt unwinding. During winding movement of the belt reel toward the fully wound condition of the belt under the spring bias of the reel, the locking member 46 acts against its bias and ratchets over radial projections 52. Upon reaching the fully wound condition, the locking mechanism within cover 44 rotates locking member 46 counterclockwise, as viewed in FIG. 3, so as to allow a subsequent belt unwinding movement when use of the belt is again desired.

As seen in FIGS. 2 and 3, belt retractor 20 includes a winding prevention mechanism indicated generally by 54. This mechanism functions so as to selectively prevent the winding bias of reel 32 from winding belt 22 onto the reel after it is pulled from its fully stored condition outwardly for buckling of D-ring 24 to buckle 18. A seated occupant may thus pull out a length of belt 22 slightly longer than is necessary and then release the belt 22 prior to buckling without the belt winding back into the retractor. Winding prevention mechanism 54 releases the belt reel 32 when the buckled belt is given a slight outward jerk and then allows the winding bias of the reel to retract this belt in a manner that snugly belts the occupant and allows winding storage of the belt after unbuckling of D-ring 24 from buckle 18.

Winding prevention mechanism 54 includes a pawl 56 and a sensing member 58 located in side-by-side relationship adjacent the end plate 38 of belt reel 32. A headed pin or shaft 60 supports the pawl 56 and sensing member 58 on the retractor housing and extends between the housing side walls 30 with its unheaded end receiving a snap ring or clip 62, as seen in FIG. 2, so as to secure the shaft in position. An elongated sleeve 64 extends between the right-hand side wall 30 and the sensing member 58 so as to axially position these components along the shaft 60.

The pawl 56 includes a lower locking nose 66, seen best in FIG. 3, and defines an elongated slot 68 which receives the shaft 60 so as to thereby mount the pawl for both bodily shifting and pivotal movement with respect to the retractor housing. Locking nose 66 is selectively engageable with secondary locking surfaces 70 on the belt reel end plate 38 to provide the winding prevention of this belt retractor. These secondary locking surfaces face the primary locking surfaces 50 in an opposed relationship and while the other reel end plate 40 does not necessarily include these secondary locking surfaces, it does include primary locking surfaces aligned with those of end plate 38. The sensing member 58 is mounted on shaft 60 adjacent the pawl 56 for pivotal movement about the shaft 60 and includes a projecting arm 72 that is biased upwardly into engagement with the stored portion of belt 22 on reel 32 by a leaf spring 74 mounted on the base wall 28 of the retractor housing by a rivet 76. The sensing member 58 also supports a leaf spring 78 which has a somewhat L-shaped configuration when viewed as in FIG. 2. The right-hand lower end of this spring is slotted to receive the shank of a screw and washer arrangement 79 that thereby secures the spring to the sensing member. This spring is cooperable with pawl 56 in a manner that will be subsequently described to control the pawl movement during operation of retractor 20.

The operation of winding prevention mechanism 54 will now be described by first referring to FIG. 3 where the restraint belt 22 is shown in a fully stored and wound condition. In this condition, shaft 60 engages the upper end of slot 68 in the pawl 56 and the vertical surface of the heel 82 on the pawl engages the lateral side of a screw head or pin 84 carried by the sensing member 58. As the belt 22 is pulled out of retractor 20 for use and consequently rotates belt reel 32 counterclockwise from its FIG. 3 position, the sensing member is pivoted upwardly in a counterclockwise direction by leaf spring 74 as the sensing member arm 72 reads a decreasing diameter of stored belt on the belt reel. This upward pivoting of the sensing member causes the engaged surfaces between the heel 82 of the pawl and pin 84 on the sensing member to move the pawl upward in a counterclockwise direction about shaft 60 to the FIG. 4 position where the locking nose 66 of the pawl ratchets over the radial projections 52 of the belt reel end plate 38. This ratcheting also causes the engaged surfaces between the pawl heel 82 and pin 84 to pivot the sensing member 58 clockwise about shaft 60 in an undulating manner against the bias of leaf spring 74.

Figure 5:
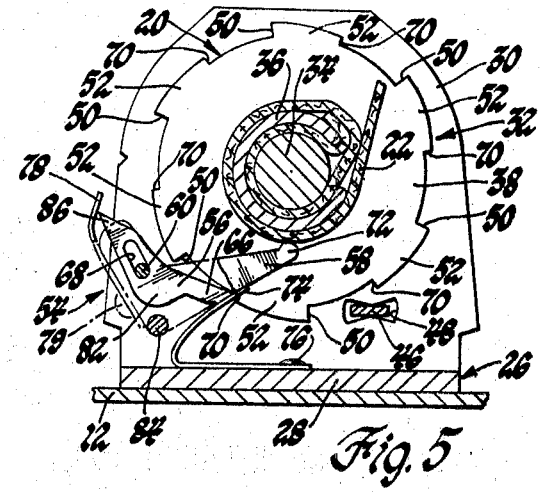
FIG. 5 is a view taken in a manner similar to FIG. 4 and shows the winding prevention mechanism in a locked condition where winding of the unwound belt is prevented.
Figure 4:
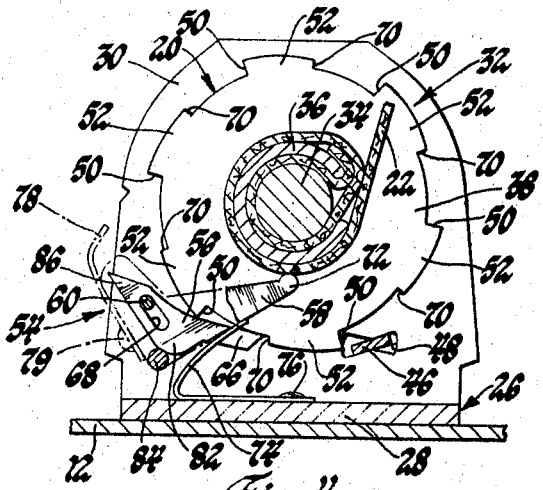
FIG. 4 is a view taken similar to FIG. 3 and shows the winding prevention mechanism as the belt is being unwound from the reel.

When an occupant has unwound a sufficient length of belt 22 to permit buckling of D-ring 24 to the buckle 18 so that the occupant of seat 10 may be encircled by the belt arrangement, belt 22 may be manually released so that the winding spring bias of belt reel 32 rotates the reel in a clockwise direction from its FIG. 4 position to its FIG. 5 position. This reel rotation engages the pawl locking nose 66 with one of the secondary locking surfaces 70 on reel end plate 38 and bodily shifts pawl 56 so that shaft 60 engages the lower end of pawl slot 68 and thereby locks belt reel 32 against belt winding rotation. A seat occupant can thus release the belt 22 prior to and while performing the buckling operation that interconnects D-ring 24 and buckle 18 without the belt being wound back on reel 32. The bodily shifting movement of pawl 56 to its FIG. 5 position also engages the upper end 86 of the pawl with the upper free end of leaf spring 78 and deflects this portion of the leaf spring in the manner shown.

Figure 6:
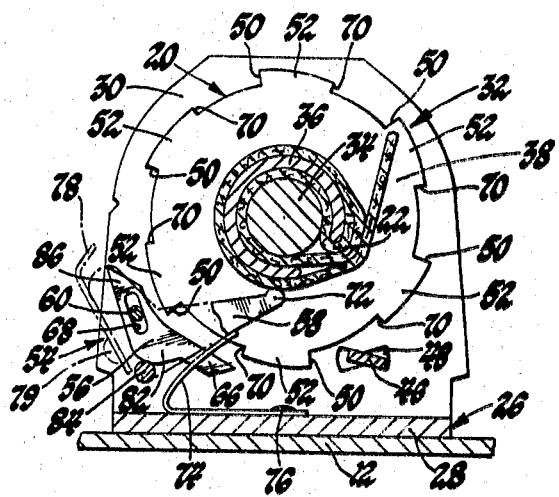
FIG. 6 is a view of the retractor taken in a manner similar to FIG. 5 and shows the winding prevention mechanism after a slight belt unwinding movement has moved the mechanism to an unlocked condition so as to allow belt winding reel rotation.

After the buckling is performed and the belted occupant gives belt 22 a slight jerk so as to rotate reel 32 in a counterclockwise direction, the pawl locking nose 66 disengages the secondary locking surface 70 and the bias of spring 78 then rotates the locking pawl clockwise about shaft 60 and bodily shifts the pawl toward its FIG. 6 position. The shaft 60 is located intermediate the ends of pawl slot 68 with the pawl in this position and the lower surface of pawl heel 82 is biased by gravity into engagement with the upper surface of pin 84. This gravity bias thus maintains pawl 56 out of engagement with belt reel 32 to allow reel rotation that snugly belts the seat occupant under the normal winding bias of the reel.

When the seat occupant subsequently unbuckles the D-ring from buckle 18, the belt reel is free to rotate in the clockwise belt winding direction toward the FIG. 3 fully wound and stored position. The upper free end of spring 78 engages the adjacent edge of housing side wall 30 as this belt winding reel movement proceeds and the pin 84 on sensing member 58 moves out of engagement with the lower surface of pawl heel 82 as the sensing member pivots downwardly in response to the increased diameter of stored belt on reel 32. This allows the pawl to drop under the influence of gravity to its FIG. 3 position where the upper end of pawl slot 68 engages the shaft 60, and where the lateral surface of pawl heel 82 engages the lateral surface of pin 84 on sensing member 58 so as to be ready for another movement into locked engagement with belt reel 32 upon subsequent unwinding of belt 22.

It should be obvious that the relative positions of the locking member 46 for preventing belt unwinding and the locking pawl 56 for preventing belt winding must be arranged so that a slight unwinding movement of the belt reel is possible when the pawl is located in its FIG. 5 position in engagement with the reel. This is achieved by arranging the relative positions of these components with respect to the associated primary and secondary locking surfaces on the radial projections 52 in a manner that spaces the left-hand edge of locking member 46 from the next adjacent primary locking surface 50. If this were not the case, the pawl and locking member would prevent movement of the belt reel in either direction and thus defeat the intended function of belt retractor 20.

It should also be obvious that this winding prevention mechanism may be utilized with other types of locking mechanisms such as inertia locking mechanisms whose locking is actuated in response to the rate of belt reel movement, an abrupt change in the rate of vehicle movement, or both of these former conditions.

It is believed evident from the foregoing description that this invention provides an improved winding prevention mechanism for a vehicle occupant restraint belt retractor.

What is claimed is:

1. In a vehicle occupant restraint belt retractor including a housing, a restraint belt having an attachment portion at one end thereof, a belt reel attached to the other end of the restraint belt and mounted on the housing for rotation in belt winding and unwinding directions, and belt reel including a pair of end plates with circumferentially spaced primary locking surfaces facing in the belt unwinding direction of rotation, spring means normally biasing the reel in the winding direction to store the belt on the reel, the belt being unwound from the reel against the bias of the spring means for movement to a use position of an appropriate length where the attachment portion of the belt is attachable in a manner that belts a seated vehicle occupant, and locking means including a locking member selectively moved into engagement with a pair of the primary locking surfaces on the end plates of the belt reel so as to selectively prevent unwinding rotation of the reel with the belt in use position and to thereby restrain the belted occupant, a mechanism for preventing winding movement of the belt reel during attachment of the belt in use position, the mechanism comprising:

a plurality of circumferentially spaced secondary locking surfaces on one of the end plates of the belt reel, these secondary locking surfaces facing in the direction of belt winding movement in generally opposed relationship to the primary locking surfaces on the one end plate of the belt reel;

an elongated shaft mounted on the retractor housing in parallel relationship to the axis of belt reel rotation and in spaced relationship to the one end plate of the reel;

a pawl including a locking nose and an elongated slot receiving the shaft so as to mount the pawl on the retractor for movement between locked and unlocked positions where the locking nose is respectively positioned for engagement with or in spaced relationship to the secondary locking surfaces on the one end plate of the belt reel;

a sensing member mounted on shaft and engageable with the stored portion of the belt on the reel so as to sense the diameter thereof; and first and second pairs of engageable surfaces carried by the pawl and the sensing member, the first pair of surfaces being engaged so as to pivot the pawl about the shaft at one end of the slot and into locked position when the sensing member senses a decrease in the diameter of stored belt as the belt is unwound for use from its fully stored condition on the reel, this movement of the pawl to locked position causing the locking nose to engage one of the secondary locking surfaces on the one end plate of the belt so as to bodily shift the pawl in a manner that moves the other end of the slot thereof into engagement with the shaft and to thereby prevent the spring bias of the reel from winding the belt thereon as the attachment portion of the belt is attached in use portion, the locking nose of the pawl disengaging the one secondary locking surface in response to a slight belt unwinding rotation of the reel as the pawl pivots about the shaft and bodily shifts with respect thereto so that the second pair of surfaces on the pawl and sensing member are engaged under the bias of gravity to locate the pawl with the shaft at an intermediate portion of the slot thereof, the first pair of surfaces of the pawl and sensing member being disengaged when the pawl is positioned with the shaft intermediate the ends of the slot so that the bias of the spring means winds the excess length of the deployed belt on the reel in a manner that snugly belts the occupant, and the sensing member sensing a return of the belt to its fully wound condition and concomitant therewith moving the second pair of surfaces on the pawl and sensing member out of engagement with each other so that gravity bodily shifts the pawl to a position where the shaft is again located at the one end of the slot and where the first pair of surfaces on the pawl and sensing member are again engaged.

2. In a vehicle occupant restraint belt retractor including a housing, a restraint belt having an attachment portion at one end thereof, a belt reel attached to the other end of the restraint belt and mounted on the housing for rotation in belt winding and unwinding directions, the belt reel including a pair of end plates with circumferentially spaced primary locking surfaces facing in the belt unwinding direction of rotation, spring means normally biasing the reel in the winding direction to store the belt on the reel, the belt being unwound from the reel against the bias of the spring means for movement to a use position of an appropriate length where the attachment portion of the belt is attachable in a manner that belts a seated vehicle occupant, and locking means including a locking member selectively moved into engagement with a pair of the primary locking surfaces on the end plates of the belt reel so as to selectively prevent unwinding rotation of the reel with the belt in use position to thereby restrain the belted occupant, a mechanism for preventing winding movement of the belt reel during attachment of the belt in use position, the mechanism comprising:

a plurality of circumferentially spaced secondary locking surfaces on one of the end plates of the belt reel, these secondary locking surfaces facing in the direction of belt winding movement in generally opposed relationship to the primary locking surfaces on the one end plate of the belt reel;

an elongated shaft mounted on the retractor housing in parallel relationship to the axis of belt reel rotation and in spaced relationship to the one end plate of the reel;

a pawl including a locking nose and an elongated slot receiving the shaft so as to mount the pawl on the retractor for movement between locked and unlocked positions where the locking nose is respectively positioned for engagement with or in spaced relationship to the secondary locking surfaces on the one end plate of the belt reel;

a belt sensing arrangement including a sensing member mounted for pivotal movement about the longitudinal axis of the shaft, and a spring for biasing the sensing member into engagement with the stored portion of the belt on the reel so that the sensing member pivots in a manner that reflects the diameter of this stored portion of the belt;

first and second pairs of engageable surfaces carried by the pawl and the sensing member, the first pair of surfaces being engaged so as to pivot the pawl about the shaft at one end of the slot and into locked position when the sensing member pivots in response to a decrease in the diameter of stored belt as the belt is unwound for use from its fully stored condition on the reel, and this movement of the pawl to locked position causing the locking nose thereof to engage one of the secondary locking surfaces on the one end plate of the belt reel so as to bodily shift the pawl in a manner that moves the other end of the slot thereof into engagement with the shaft and to thereby prevent the spring bias of the reel from winding the belt thereon as the attachment portion of the belt is attached in use position; and a leaf spring carried by the sensing member and deflected by the pawl as the pawl shifts and moves the other end of the slot into engagement with the shaft, this spring deflection causing the pawl to rotate and bodily shift the pawl as a slight belt unwinding rotation of the reel disengages the locking nose thereof from the one secondary locking surface on the reel, this rotating and bodily shifting movement of the pawl engaging the second pair of surfaces on the pawl and sensing member so that the bias of gravity maintains the pawl with the shaft at an intermediate portion of the slot and with the pawl out of engagement with the reel to allow the bias of the spring means to wind the excess length of the deployed belt on the reel in a manner that snugly belts the occupant, and the leaf spring engaging the housing as the belt is returned to its fully wound condition so that the consequent pivotal movement of the sensing member disengages the second pair of surfaces on the pawl and sensing member to allow the pawl to bodily shift downwardly under the bias of gravity and to engage the first pair of surfaces on the pawl and sensing member so that the pawl is ready for locking movement upon subsequent use of the belt.

* * * * *

PO-1050
(5/69)

UNITED STATES PATENT OFFICE
CERTIFICATE OF CORRECTION

Patent No. __3,858,826__     Dated __January 7, 1975__

Inventor(s) __Raymond G. Sprecher__

It is certified that error appears in the above-identified patent and that said Letters Patent are hereby corrected as shown below:

Column 1, line 64, "preventing" should read -- prevention --. Column 4, line 22, after "belt" change "12" to -- 22 --. Column 6, line 64, after "rections" change "and" to -- the --. Column 7, line 49, after "use" change "portion" to -- position --.

Signed and sealed this 29th day of April 1975.

(SEAL)
Attest:

RUTH C. MASON
 Attesting Officer

C. MARSHALL DANN
Commissioner of Patents
   and Trademarks